(12) United States Patent
Fujii et al.

(10) Patent No.: US 8,485,924 B2
(45) Date of Patent: Jul. 16, 2013

(54) BICYCLE CHAIN GUIDE

(75) Inventors: Nobuyoshi Fujii, Sakai (JP); Yoshiaki Nanko, Sakai (JP)

(73) Assignee: Shimano Inc., Osaka (JP)

( * ) Notice: Subject to any disclaimer, the term of this patent is extended or adjusted under 35 U.S.C. 154(b) by 1519 days.

(21) Appl. No.: 11/698,956

(22) Filed: Jan. 29, 2007

(65) Prior Publication Data

US 2008/0182689 A1   Jul. 31, 2008

(51) Int. Cl.
*F16H 9/00* (2006.01)

(52) U.S. Cl.
USPC .................. 474/82; 474/70; 474/78; 474/80; 285/15; 285/373

(58) Field of Classification Search
USPC ...................................... 474/78–82
See application file for complete search history.

(56) References Cited

U.S. PATENT DOCUMENTS

| | | | |
|---|---|---|---|
| 6,009,771 A * | 1/2000 | Desenclos et al. | 74/502.4 |
| 6,629,903 B1 * | 10/2003 | Kondo | 474/82 |
| 6,923,740 B2 | 8/2005 | Nanko | |
| 6,962,544 B2 * | 11/2005 | Nanko | 474/80 |
| 6,986,723 B2 * | 1/2006 | Valle | 474/80 |
| 2006/0029465 A1 * | 2/2006 | Auer | 403/383 |
| 2007/0123379 A1 * | 5/2007 | Peh et al. | 474/80 |
| 2007/0191158 A1 * | 8/2007 | Ichida et al. | 474/80 |
| 2007/0293359 A1 * | 12/2007 | Yamamoto et al. | 474/80 |

* cited by examiner

*Primary Examiner* — Robert A Siconolfi
*Assistant Examiner* — San Aung
(74) *Attorney, Agent, or Firm* — Global IP Counselors

(57) ABSTRACT

A bicycle chain guide includes a first guide plate, a second guide plate, a first connection part and a second connection part. The first guide plate has a first chain engagement surface and the second guide plate has a second chain engagement to form a chain receiving area. The first and second connection parts extend between the first and second guide plates to connect the first and second guide plates together at first and second spaced locations, respectively. The first connection part is fixed to the first guide plate by a fastener. The first guide plate has a first abutment and the first connection part has a second abutment. The first and second abutments are arranged at a rear end of the chain guide to limit relative movement of the first and second guide plates.

15 Claims, 6 Drawing Sheets

BICYCLE CHAIN GUIDE

BACKGROUND OF THE INVENTION

1. Field of the Invention

This invention generally relates to a bicycle chain guide. More specifically, the present invention relates to bicycle chain guide for a bicycle front derailleur the limits relative movement between the guide plates at the rear end of the chain guide.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur.

Generally, a front derailleur is mounted to the bicycle frame adjacent to the front sprockets to shift a chain laterally between the front sprockets. A front derailleur includes a fixed member non-movably secured to the bicycle frame, and a movable member with a chain guide that is movably supported relative to the fixed member to move between at least two lateral shift positions. Typically, a linkage assembly is coupled between the fixed member and the movable member in order to movably support the movable member with the chain guide. The chain guide has a pair of cage plates or guide plates arranged to selectively contact and move the chain between the front sprockets.

The movable member with the chain guide is movable relative to the fixed member by pulling/releasing a shift control cable. The control cable is typically connected to one of the pivotal links of the linkage assembly. A biasing member is typically arranged to bias the chain guide to an extend most or retracted most position. Pulling the shift control cable moves the chain guide against the biasing force of the biasing member. Releasing the shift control cable allows the chain guide to move in the opposite direction due to the biasing force of the biasing member.

The chain guide is typically constructed of relatively thin plates, which are subjected to various forces during shifting. If the chain jams during riding and/or shifting, the front chain guide may be subjected to even stronger forces than applied during normal use. It is possible for typical front chain guides to bend when powerful forces, such as when the chain jams, are applied thereto. The chain guide can be constructed of thicker plates to prevent bending. However, this causes the chain guide to become heavier, which is undesirable. Prior art derailleurs can also be relatively complicated and expensive to manufacture and assemble.

In view of the above, it will be apparent to those skilled in the art from this disclosure that there exists a need for an improved bicycle chain guide for a bicycle front derailleur. This invention addresses this need in the art as well as other needs, which will become apparent to those skilled in the art from this disclosure.

SUMMARY OF THE INVENTION

One object of the present invention is to provide a chain guide for a bicycle front derailleur, which shifts smoothly and reliably.

Another object of the present invention is to provide chain guide for a front derailleur, which is relatively strong and rigid, yet is relatively lightweight.

Another object of the present invention is to provide a chain guide for a bicycle front derailleur, which is relatively simple and inexpensive to manufacture and assemble.

The foregoing objects can basically be attained by providing a bicycle chain guide, which comprises a first guide plate, a second guide plate, a first connection part and a second connection part. The first guide plate has a first chain engagement surface. The second guide plate has a second chain engagement surface facing the first chain engagement surface to form a chain receiving area therebetween. The first connection part extends between the first and second guide plates to connect the first and second guide plates together at a first location. The first connection part is fixed to the first guide plate by a fastener. The second connection part extends between the first and second guide plates to connect the first and second guide plates together at a second location spaced from the first location. The first guide plate has a first abutment and the first connection part has a second abutment. The first and second abutments are arranged at a rear end of the chain guide to limit relative movement of the first and second guide plates.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
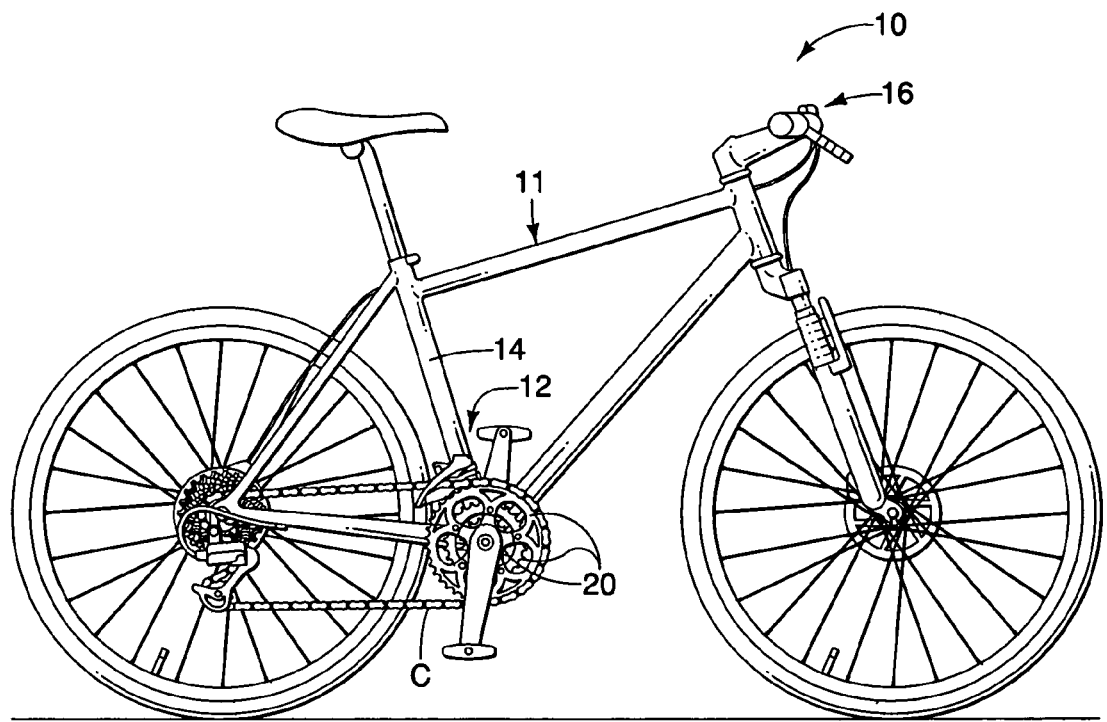
FIG. 1 is a side elevational view of a bicycle with a bicycle front derailleur coupled thereto in accordance with a first preferred embodiment of the present invention.
Figure 2:
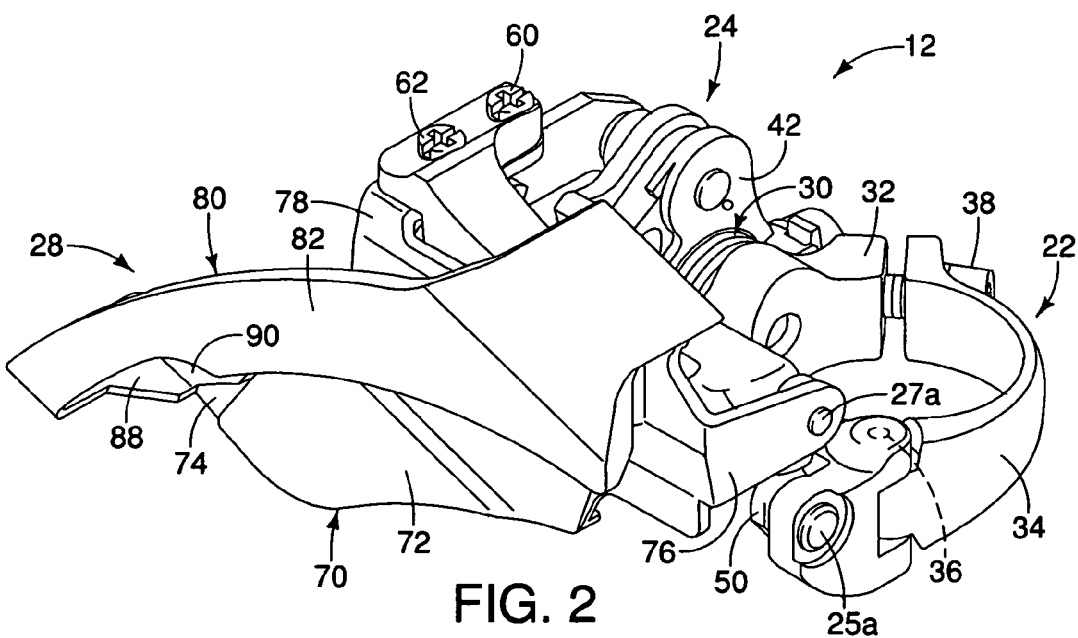
FIG. 2 is an enlarged, upper/front perspective view of the bicycle front derailleur illustrated in FIG. 1.
Figure 3:
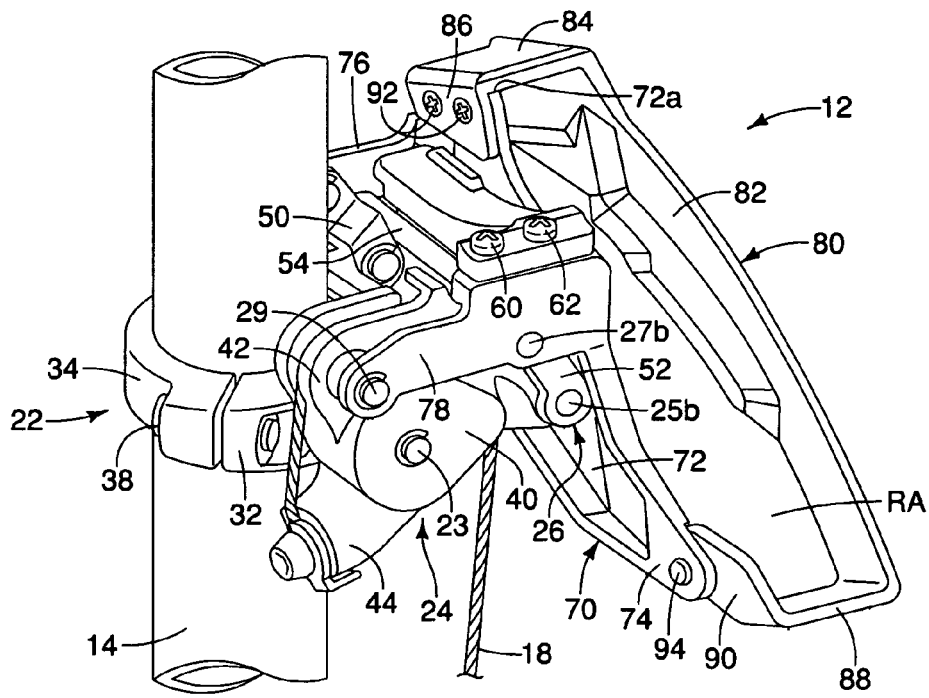
FIG. 3 is an enlarged, upper/rear perspective view of a portion of the frame of the bicycle illustrated in FIG. 1 with the bicycle front derailleur coupled thereto, with a control element (wire) extending downwardly from the front derailleur along the portion of the frame.

Referring initially to FIGS. 1-3, a bicycle 10 is illustrated with a bicycle front derailleur 12 attached thereto in accordance with a first embodiment of the present invention. The front derailleur 12 is mounted to the seat tube 14 of the frame 11 of the bicycle 10. The front derailleur 12 is operated by a shifting unit 16 via a shift cable 18 to move a chain C between at least two (three illustrated herein) front sprockets or chain rings 20. The front derailleur 12 includes a fixed member 22, a cable attachment link 24, a support link 26 and a chain guide 28 in accordance with the present invention. The chain guide 28 is constructed of relatively thin plate type pieces that are arranged and configured to limit relative movement between the pieces at the rear end of the chain guide 28. A biasing member 30 normally biases the chain guide 28 in a transverse direction towards the frame 11 of bicycle 10.

The front derailleur 12 is relatively conventional, except for the chain guide 28. Accordingly, the front derailleur 12 will not be explained and/or illustrated in detail herein, except as related to the chain guide 28 of the present invention. The basic operation of the front derailleur 12 can be understood from U.S. Pat. No. 6,923,740. Also, bicycles and their various components are well known in the bicycle art, and thus, the bicycle 10 and its various components will not be discussed or illustrated in detail herein, except for the components that relate to the front derailleur 12 of the present invention.

Figure 4:
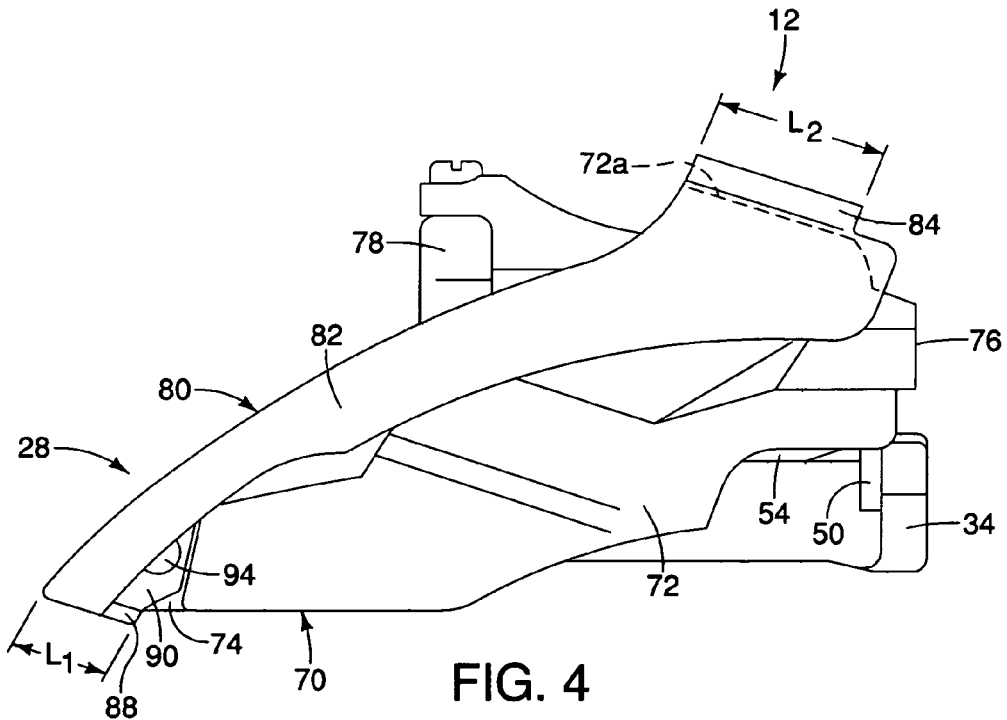
FIG. 4 is an outside elevational view of the bicycle front derailleur illustrated in FIGS. 2 and 3.
Figure 5:
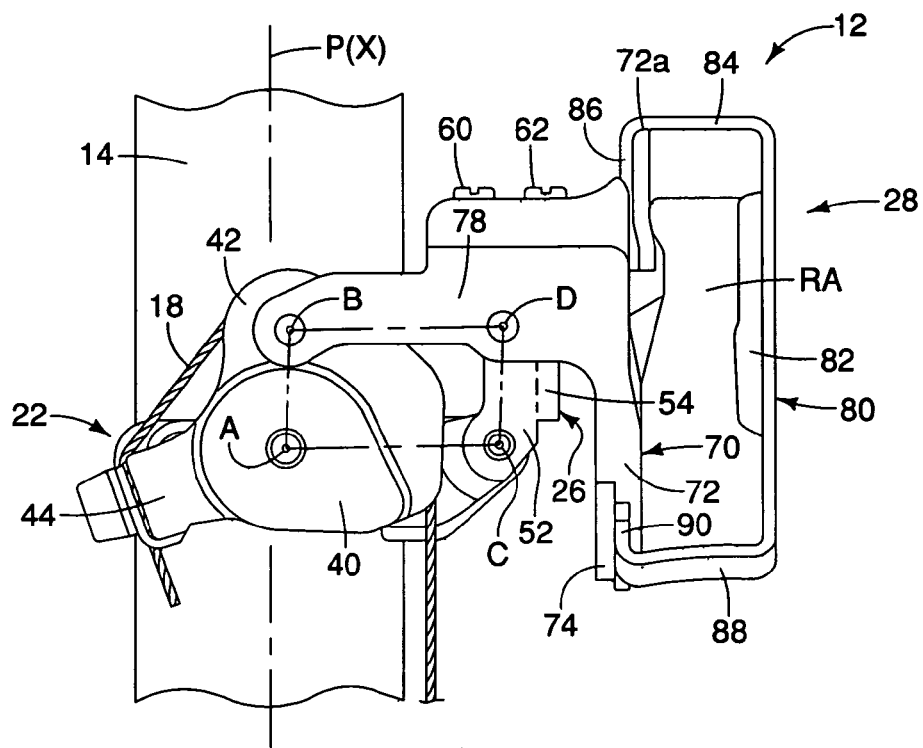
FIG. 5 is a rear end elevational view of the bicycle front derailleur illustrated in FIGS. 2-4, with the chain guide in the retracted position and with the four bar linkage diagrammatically illustrated in phantom lines.
Figure 6:
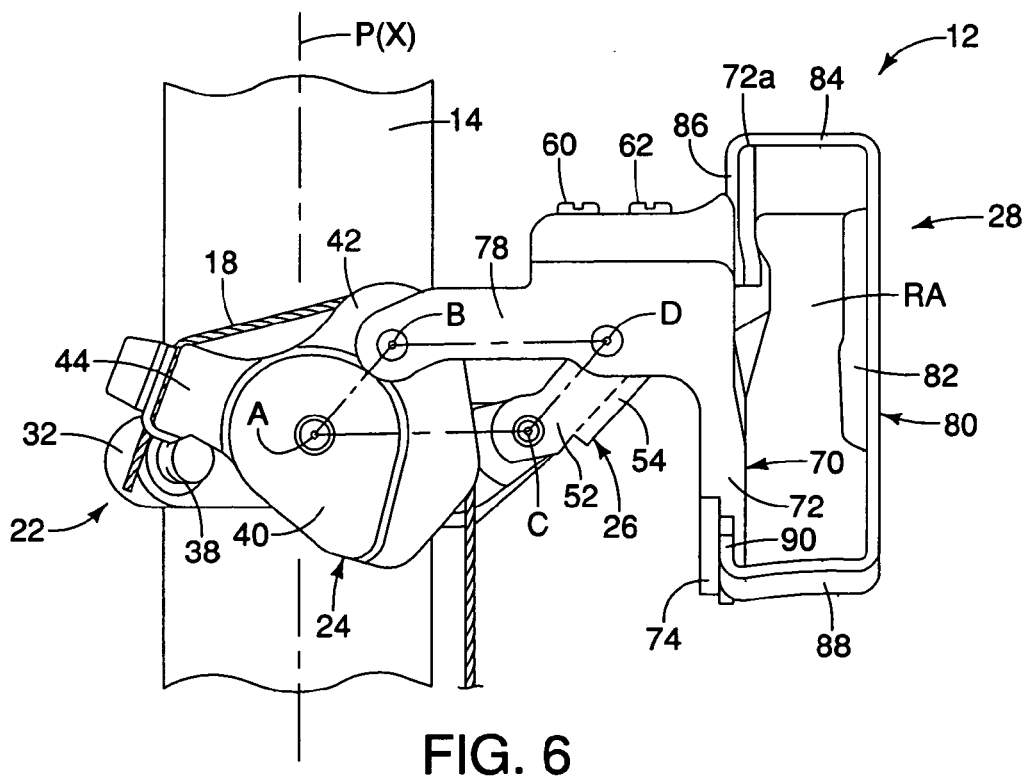
FIG. 6 is a rear end elevational view of the bicycle front derailleur illustrated in FIGS. 2-4, with the chain guide in the extended position and with the four bar linkage diagrammatically illustrated in phantom lines.

Referring to FIGS. 1-6, the front derailleur 12 can be used with the shift cable 18 coming from above the front derailleur 12 (not shown), or with the shift cable 18 coming from below the front derailleur 12 as seen in FIGS. 3, 5 and 6. In other words, the cable 18 can be coupled to the cable attachment link 24 of the front derailleur 12 such that its inner wire is either pulled upwardly or pulled downwardly from front derailleur 12 by the shifting unit 16. The shifting unit 16 is conventional and can be any of a variety of types of shifting units. Therefore, the precise structure of the shifting unit 16 will not be discussed or illustrated in detail herein.

Portions of the fixed member 22, the cable attachment link 24, the support link 26 and the chain guide 28 constitute parts of a four bar linkage assembly that is relatively wide. The four bar linkage assembly is preferably defined by four pivot axes A, B, C and D as best seen in FIGS. 5 and 6. A portion of the cable attachment link 24 defines a one link between the pivot axes A and B, a portion of the support link 26 defines one link between the pivot axes C and D, a portion of the chain guide 28 defines one link between the pivot axes B and D, and a portion of the fixed member 22 defines one link between the pivot axes A and C.

The cable attachment link 24 is pivotally supported about the pivot axis A on a pivot pin 23 that is fixedly coupled to the fixed member 22. A pair of pivot pins 25a and 25b that are located on the pivot axis C pivotally support one end of the support link 26 on the fixed member 22. The other end of the support link 26 pivotally supports the chain guide 28 by a pair of pivot pins 27a and 27b that are located on the pivot axis D. A pivot pin 29 located on the pivot axis B is pivotally coupled to the cable attachment link 24 and pivotally supports the chain guide 28. A plurality of snap-on retaining washers such as c-clips or E-clips are utilized on the pivot pins 23, 25a, 25b, 27a, 27b and 29 in order to prevent separation of the parts of the front derailleur 12 once assembled. Each of the pivot pins 23, 25a, 25b, 27a, 27b and 29 preferably has a groove for receiving retaining washers in a conventional manner.

Due to the above arrangement, the chain guide 28 is movably coupled to the fixed member 22 via the cable attachment link 24 and the support link 26 to move between at least one retracted (low gear) position and at least one extended (high gear) position relative to the fixed member 22, as best understood from FIGS. 5 and 6. The movements of the chain guide 28 are controlled by the shifting unit 16. Specifically, when the rider squeezes the lever of the shifting unit 16, this pulls the shift cable 18 to move the chain guide 28 between its retracted position and its extended position via the linkage assembly in a relatively conventional manner.

Referring to FIGS. 2-6, the fixed member 22 will now be discussed. The fixed member 22 is attached to the seat tube 14. Specifically, the fixed member 22 is preferably a tubular clamping member or mechanism that is attached to the seat tube 14 of the bicycle 10. However, it will be apparent to those skilled in the art from this disclosure that front derailleur 12 can be coupled to other parts of the bicycle such as the bottom bracket as needed and/or desired. In any event, the chain guide 28 is movably supported relative to the fixed member 22 by the cable attachment link 24 and the support link 26 to move laterally relative to a longitudinal center plane P of the bicycle 10 between various shift positions (i.e., at least one retracted position and at least one extended position) that correspond to the positions of the front sprockets 20. The seat tube 14 preferably includes a center axis X that lies within the longitudinal plane P.

The fixed member 22 is preferably located beneath the chain guide 28 (at least below the top portion of the chain guide 28 coupled to the cable attachment link 24 and the support link 26) in this embodiment. The fixed member 22 basically includes a first clamping portion 32, a second clamping portion 34, a pivot pin 36 and a fastener 38, as best seen in FIG. 2. First ends of clamping portions 32 and 34 are pivotally coupled together by the pivot pin 36, which extends in a substantially vertical direction relative to the bicycle 10 in a conventional manner. The other ends of clamping portions 32 and 34 are releasably connected together via the fastener 38. The first and second clamping portions 32 and 34 are constructed of a rigid material to secure the front derailleur 12 to the seat post 14 of the bicycle 10. Preferably, clamping portions 32 and 34 are constructed of metal utilizing conventional manufacturing techniques such as stamping/bending, casting and/or machining.

Referring still to FIGS. 2-6, the cable attachment link 24 includes a mounting portion 40, a link portion 42 and a cable attachment portion 44. The cable attachment link 24 is preferably constructed of a hard, rigid material. For example, the cable attachment link 24 is preferably constructed of metal utilizing conventional manufacturing techniques such as stamping/bending, casting and/or machining. The mounting portion 40 is pivotally coupled to the fixed member 22 via the pivot pin 23, while the link portion 42 pivotally supports the chain guide 28. The cable attachment portion 44 has the shift control cable 18 attached thereto to control movement of the cable attachment link 24 together with the biasing member 30.

Specifically, when the inner wire of the cable 18 is pulled via the shifting unit 16, the cable attachment link 24 rotates about the pivot axis A. Thus, the link portion 42 also rotates about the pivot axis A, which then moves the chain guide 28 via the pivot pin 29 toward the extended position. On the other hand, when the inner wire of the control cable 18 is released, the cable attachment link 24 rotates about the pivot axis A in an opposite direction due to the biasing force of the biasing member 30, which then moves the chain guide 28 via the pivot pin 29 toward the retracted position. The mounting portion 40 includes an annular recess (not shown), which at least partially receives the biasing member 30. The biasing member 30 is preferably a torsion spring having its coiled portion positioned around pivot pin 23. In any event, the biasing member 30 is disposed between the cable attachment link 24 and the fixed member 22 with opposite ends of the biasing member 30 engaging the cable attachment link and the fixed member to apply a rotational biasing force to the cable attachment link 24.

Referring still to FIGS. 2-6, the support link 26 includes a pair (front and rear) of link plates 50 and 52 with a connecting portion 54 extending between the link plates 50 and 52. The support link 26 is preferably constructed of a hard rigid material. For example, the support link is preferably constructed of metal utilizing conventional manufacturing techniques such as stamping/bending, casting and/or machining. When the front derailleur 12 is assembled, the link plates 50 and 52 are substantially vertical plates, while the connecting portion 54 extends in a longitudinal direction relative to the bicycle 10.

The link plates 50 and 52 are pivotally coupled to the first clamping portion 32 of the fixed member 22 via the pivot pins 25a and 25b, respectively. The link plates 50 and 52 are also pivotally coupled to the chain guide 28 via the pivot pins 27a and 27b, respectively, in order to pivotally support the chain guide 28, as discussed below. The link plate 50 is provided with a fan-shaped end that selectively engages adjustment screws 60 and 62 for limiting movement of chain guide 28 in its extended most position and its most retracted position, respectively, in a conventional manner. The adjustment screws 60 and 62 are threadedly attached to the chain guide 28. Thus, the adjustment screw 60 is a high adjustment screw that limits outward movement of the chain guide 28 in its (top) extended most position, while the adjustment screw 62 is a low adjustment screw that limits inward movement of the chain guide 28 in its (low) retracted most position.

Referring now to FIGS. 2-10, the chain guide 28 in accordance with this first embodiment of the present invention will now be explained in more detail. The chain guide 28 includes an inner guide plate 70 and an outer guide plate 80 rigidly connected to the inner guide plate 70 in a spaced arrangement to form a chain receiving area RA therebetween. Each of the guide plates 70 and 80 is preferably constructed of a hard rigid material. For example, each of the guide plates 70 and 80 of the chain guide 28 is preferably constructed of metal such as a rigid sheet metal that is bent to the desired shape. The inner and outer guide plates 70 and 80 are connected together at the front of the chain guide 28 and at the rear of the chain guide 28. The inner guide plate 70 is pivotally coupled to the cable attachment link 24 using the pivot pin 23, and pivotally coupled to the link plates 50 and 52 of the support link 26 using the pivot pins 27a and 27b, respectively.

The inner guide plate 70 includes an inner chain engagement (first) section 72, an offset (second) section 74, a front link attachment section 76 and a rear link attachment section 78, which are preferably integrally formed together as a one-piece, unitary member from deformed sheet metal material. The inner chain engagement section 72 has an inner chain engagement surface generally parallel to the center plane P and facing the outer guide plate 80. The front and rear link attachment sections 76 and 78 extend generally perpendicularly and laterally inwardly from the inner chain engagement section 72. The offset section 74 is offset from the first section 72 in a direction away from the second guide plate 80 such that a transition section 73 is formed between the sections 72 and 74 of the inner guide plate 70. The offset section 74 is generally parallel to the inner chain engagement section 72 such that a (first) abutment shoulder with an abutment surface 73a is formed at the transition section 73. The abutment surface 73a is generally perpendicular to the inner chain engagement surface of the inner chain engagement section 72.

The outer guide plate 80 includes an outer chain engagement section 82, a front connecting section 84, a front attachment flange 86, a rear connecting section 88 and a rear attachment flange 90, which are preferably integrally formed together as a one-piece, unitary member from deformed sheet metal material. The outer chain engagement section 82 has an outer chain engagement surface generally parallel to the center plane P and facing the inner chain engagement surface of the inner guide plate 70 to form the chain receiving area RA therebetween. The front and rear connecting sections 84 and 88 extend generally perpendicular to the outer chain engagement section 82. The front and rear attachment flanges 86 and 90 extend generally perpendicular to the front and rear connecting sections 84 and 88, respectively. Thus, the front and rear attachment flanges 86 and 90 are generally parallel to the outer chain engagement section 82. The front and rear attachment flanges 86 and 90 are attached to the inner guide plate 70.

The front attachment flange 86 is attached to the inner guide plate 70 using a pair of fasteners 92 to rigidly attach the inner and outer guide plates 70 and 80 together at a front location. The fasteners 92 illustrated herein are threaded fasteners or screws. However, it will be apparent to those skilled in the art from this disclosure that other types of fasteners can be used in place of the fasteners 92 if needed and/or desired. For example, rivets may be used as fasteners in place of the fasteners 92 such that no threaded holes or nuts are needed. The front attachment flange 86 is disposed on an inner lateral side of the inner chain engagement section 72. A free edge 72a of the inner guide plate 70 preferably abuts (contacts) the front connecting section 88.

Figure 7:
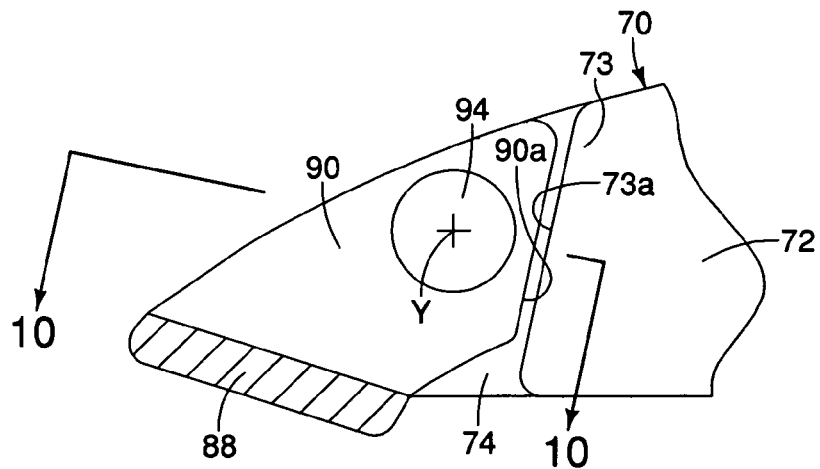
FIG. 7 is an enlarged, partial cross-sectional view of the chain guide of the bicycle front derailleur illustrated in FIGS. 2-6, as viewed along section line 7-7 of FIG. 5.
Figure 8:
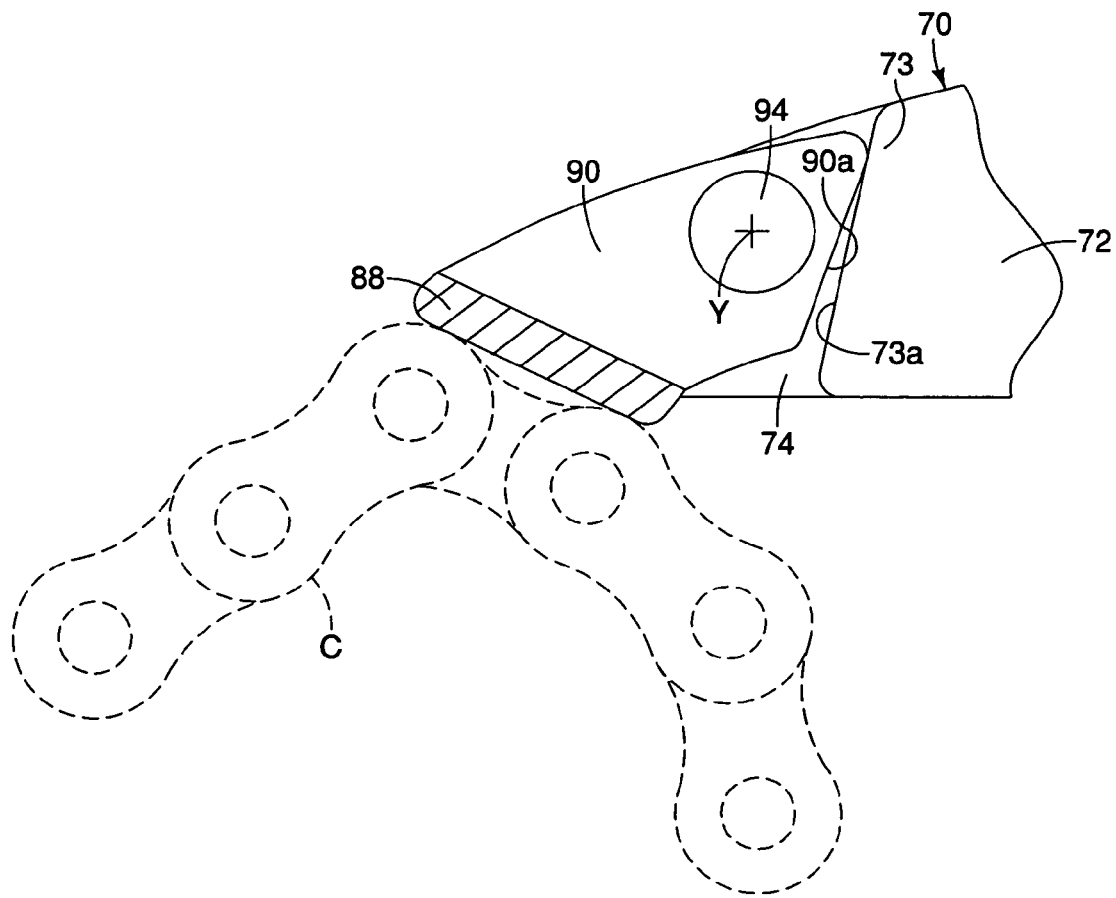
FIG. 8 is a view of the portion of the chain guide illustrated in FIG. 7, showing movement of the outer guide plate in response to contact from the chain, such as may occur during a chain jam.

Referring mainly to FIGS. 7-10, the rear attachment flange 90 is attached to the offset section 74 of the inner guide plate 70 using a single fastener 94 such as a rivet. The rear attachment flange 90 is shaped to form a (second) abutment having an abutment surface 90a along a free edge thereof that is opposed to the abutment surface 73a of the transition section 73. The abutment surfaces 73a and 90a are preferably flat, parallel surfaces that are slightly spaced from each other when the chain guide 28 assembled in its normal riding position as seen in FIG. 7. However, if an upward force is exerted on the rear connecting section 88 (e.g. from a chain jam on the front sprockets 20), the rear attachment flange 90 will rotate about a center axis Y of the fastener 94 until the abutment surface 90a contacts the abutment surface 73a, as shown in FIG. 8. Thus, the transition section 73 and the rear attachment flange 90 (e.g. first and second abutments) are arranged at the rear of the chain guide 28 to limit movement of the inner and outer guide plates 70 and 80 relative to each other.

Figure 9:
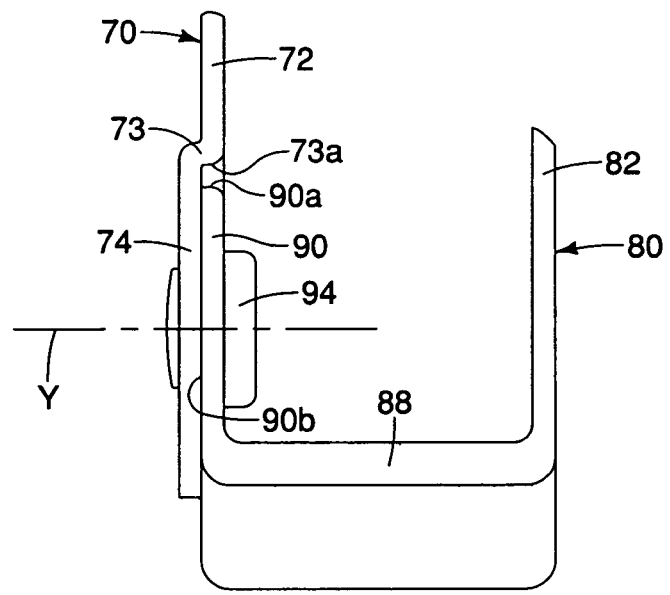
FIG. 9 is an enlarged, partial rear elevational view of the chain guide of the bicycle front derailleur illustrated in FIGS. 2-6.
Figure 10:
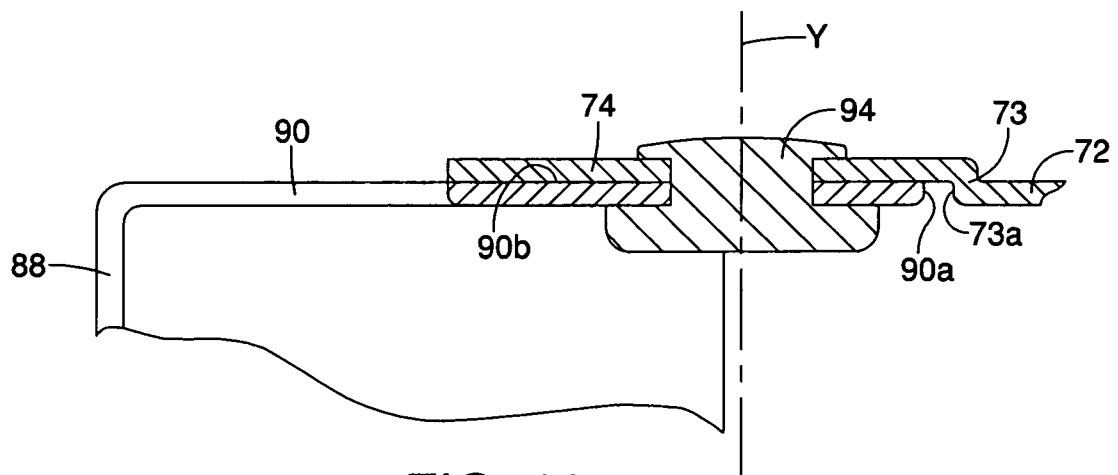
FIG. 10 is a partial cross-sectional view of the portion of the chain guide illustrated in FIG. 9, as viewed along section line 10-10 of FIG. 9.

As seen in FIGS. 4, 9 and 10, the rear attachment flange 90 further includes a contact surface 90b (e.g. a third abutment surface) that contacts the offset section 74 of the inner guide plate 70 to further limit/prevent relative movement between the inner and outer guide plates 70 and 80. The contact surface 90b is non-parallel relative to the abutment surface 90a of the rear attachment flange 90. Thus, the rear attachment flange 90 forms a pair of non-parallel abutments (e.g., second and third abutments). The rear connecting section 88 preferably has a maximum, substantially longitudinal, dimension $L_1$ that is smaller than a corresponding maximum, substantially longitudinal, dimension $L_2$ of the front connecting section 84.

In this embodiment, the front connecting section 84 and the front attachment flange 86 constitute parts of a front (second) connecting part of the chain guide 28. While the front connecting part is illustrated as being integrally formed with the outer guide plate 80, it will be apparent to those skilled in the bicycle art from this disclosure that the front connecting part can be formed as a separate part from the outer guide plate 80. Similarly, the rear connecting section 88 and the rear attachment flange 90 constitute parts of a rear (first) connecting part of the chain guide 28. While the rear connecting part is illustrated as being integrally formed with the outer guide plate 80, it will be apparent to those skilled in the bicycle art from this disclosure that the rear connecting part can be formed as a separate part from the outer guide plate 80. In any case, the front and rear connecting parts extend between the inner and outer guide plates 70 and 80 to rigidly connect the inner and outer guide plates 70 and 80 together two locations that are spaced apart from each other.

Referring again to FIGS. 2-6, the front link attachment section 76 and the rear link attachment section 78 preferably extend in a substantially vertical direction. The front and rear link plates 50 and 52 are pivotally coupled to the front and rear attachment sections 76 and 78 using the pivot pins 27a and 27b, respectively. The rear attachment section 78 has a substantially horizontal section and a substantially vertical section. The vertical section is pivotally coupled to the link plate 52 of the support link 26 using the pivot pin 27b. The vertical section is also pivotally coupled to the cable attachment link 24 using the pivot pin 29. The horizontal section has a pair of threaded holes for receiving the adjustment screws 60 and 62 therein.

Second Embodiment

Figure 11:
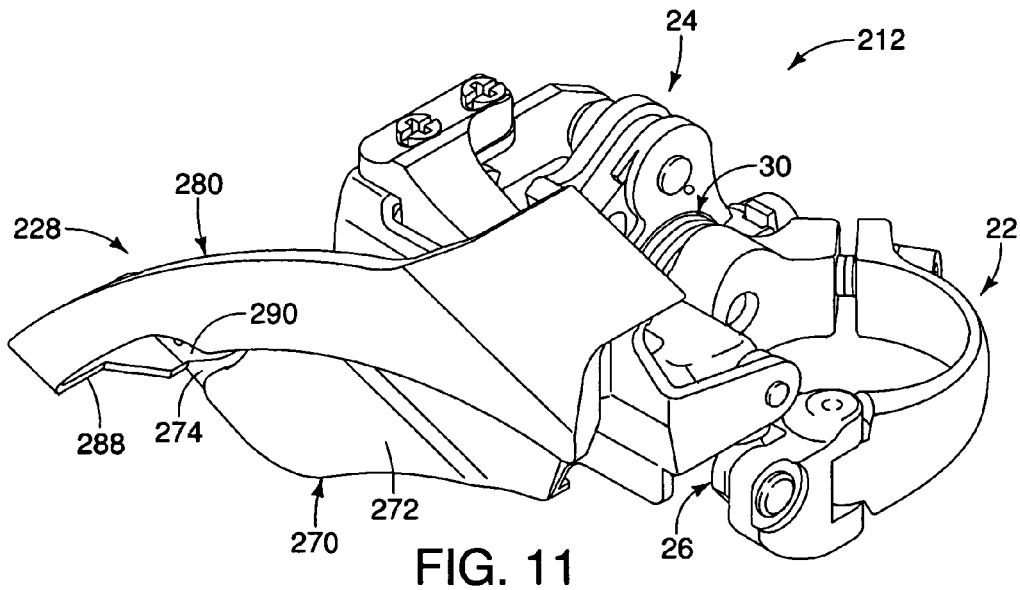
FIG. 11 is an enlarged, upper/front perspective view of a bicycle front derailleur in accordance with a second preferred embodiment of the present invention.
Figure 12:
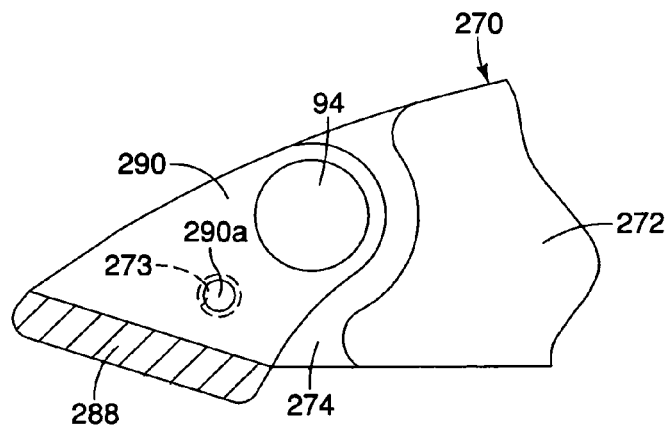
FIG. 12 is an enlarged, partial cross-sectional view of the chain guide of the bicycle front derailleur illustrated in FIG. 11, as viewed along section line 12-12 of FIG. 11.

Referring now to FIGS. 11 and 12, a front derailleur 212 having a chain guide 228 in accordance with a second embodiment of the present invention will now be explained. The front derailleur 212 of this second embodiment is identical to the front derailleur 12 of the first embodiment, except for the chain guide 228. Accordingly, the front derailleur 212 will not be discussed and/or illustrated in detail herein, except as related to the chain guide 228. However, it will be apparent to those skilled in the bicycle art from this disclosure that the descriptions and illustrations of the front derailleur 12 also apply to the front derailleur 212, except as explained and/or illustrated herein. Moreover parts of the rear derailleur 212 of this second embodiment that are identical to parts of the front derailleur 12 of the first embodiment will be identified with same reference characters as the first embodiment for the sake of convenience. Finally, parts of the rear derailleur 212 of this second embodiment that are functionally identical (but not exactly identical) to parts of the front derailleur 12 of the first embodiment will be identified with the same reference characters but with "200" added thereto for the sake of convenience.

The chain guide 228 in accordance with this second embodiment will now be explained in more detail. The chain guide 228 of this second embodiment is identical to the chain guide 28 of the first embodiment, except for the rear end of the chain guide 228. Accordingly, it will be apparent to those skilled in the bicycle art from this disclosure that the descriptions and illustrations of the chain guide 28 also apply to the chain guide 228, except as explained and/or illustrated herein. The chain guide 228 includes an inner guide plate 270 and an outer guide plate 280. The inner guide plate includes an inner chain engagement section 272 and an offset section 274, while the outer guide plate 280 includes a rear connecting section 288 and a rear attachment flange 290 that is attached to the offset section 274 using a fastener 94 such as a rivet.

The rear attachment flange 290 includes a knock pin 290a fixed thereto that is received in a mating hole 273 of the offset section 274. In this embodiment, the mating hole 273 constitutes a (first) abutment with an annular abutment surface, while the knock pin 290a constitutes a (second) abutment with an annular abutment surface. Moreover, in this embodiment, the abutment surfaces 73a and 90a have been omitted. The hole 273 is preferably the same shape, but slightly larger than the knock pin 290a in order to limit relative movement of the inner and outer guide plates 270 and 280. The knock pin 290a can be integrally formed with the rear attachment flange 290. Alternatively, the knock pin 290a can be press fitted (as illustrated in FIG. 12 herein) in a hole of the rear attachment flange 290 or welded to the attachment flange 290. In any case, the knock pin 290a is preferably non-movably, permanently fixed to the rear attachment flange 290.

Of course, it will be apparent to those skilled in the bicycle art from this disclosure that the knock pin 290a and hole 273 arrangement could be reversed if needed and/or desired. For example, the offset section 274 could include a knock pin fixed thereto, which is received in a mating hole of the rear attachment flange 290.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chain guide comprising:
   a first guide plate having a first chain engagement surface;
   a second guide plate having a second chain engagement surface facing the first chain engagement surface to form a chain receiving area therebetween;
   a first connection part extending between the first and second guide plates to connect the first and second guide plates together at a first location, the first connection part being fixed to the first guide plate by a fastener, the fastener defining an attachment axis; and
   a second connection part extending between the first and second guide plates to connect the first and second guide plates together at a second location spaced from the first location,
   the first guide plate having a first abutment and the first connection part having a second abutment, the first and second abutments being arranged at a rear end of the chain guide to limit relative rotational movement of the first and second guide plates about the attachment axis.

2. The bicycle chain guide according to claim 1, wherein the first connection part is integrally formed with the second guide plate as a one-piece, unitary member.

3. The bicycle chain guide according to claim 2, wherein the first connection part includes an attachment flange that is substantially parallel to the second guide plate and a connecting section extending between the attachment flange and the second guide plate.

4. The bicycle chain guide according to claim 3, wherein the attachment flange has the second abutment, which is arranged and configured to contact the first abutment to limit relative rotational movement of the first and second guide plates about the attachment axis of the fastener.

5. The bicycle chain guide according to claim 4, wherein the first abutment includes a first flat abutment surface and the second abutment includes a second flat abutment surface substantially parallel to the first flat abutment surface.

6. The bicycle chain guide according to claim 4, wherein the first guide plate has a first section with the first chain engagement surface and a second section offset from the first section in a direction away from the second guide plate such that the first abutment is formed at a transition section between the first and second sections of the first guide plate.

7. The bicycle chain guide according to claim 1, wherein the first abutment includes a first flat abutment surface and the second abutment includes a second flat abutment surface substantially parallel to the first flat abutment surface.

8. The bicycle chain guide according to claim 1, wherein the fastener is a rivet.

9. The bicycle chain guide according to claim 1, wherein the second connection part is integrally formed with the second guide plate as a one-piece, unitary member.

10. The bicycle chain guide according to claim 1, wherein the first and second guide plates and the first and second connection parts are constructed of sheet metal material.

11. The bicycle chain guide according to claim 1, wherein the first guide plate has a first section with the first chain engagement surface and a second section offset from the first section in a direction away from the second guide plate such that the first abutment is formed at a transition section between the first and second sections of the first guide plate.

12. The bicycle chain guide according to claim 11, wherein the first connection part includes an attachment flange fixed to the first guide plate by the fastener with an edge of the attachment flange forming the second abutment.

13. The bicycle chain guide according to claim 1, wherein the first connection part includes an attachment flange fixed to the first guide plate by the fastener with an edge of the attachment flange forming the second abutment.

14. The bicycle chain guide according to claim 13, wherein the attachment flange has a third abutment that contacts the first guide plate, the third abutment having an abutment surface that is non-parallel relative to an abutment surface of the second abutment.

15. The bicycle chain guide according to claim 1, wherein the first connection part includes an attachment flange having a third abutment that contacts the first guide plate, the third abutment having an abutment surface that is non-parallel relative to an abutment surface of the second abutment.

* * * * *